US010843430B2

(12) United States Patent
Lutzer et al.

(10) Patent No.: US 10,843,430 B2
(45) Date of Patent: Nov. 24, 2020

(54) SYSTEM FOR EXTRACTING A FLUID BY SUCTION, AND A VEHICLE WITH A SYSTEM OF THIS TYPE

(71) Applicant: Airbus Operations GmbH, Hamburg (DE)

(72) Inventors: Wilhelm Lutzer, Hamburg (DE); Matthias Reiss, Hamburg (DE); Oliver Kiehne, Hamburg (DE); Marc Spille, Hamburg (DE); Michael Kempa, Hamburg (DE)

(73) Assignee: Airbus Operations GmbH, Hamburg (DE)

(*) Notice: Subject to any disclaimer, the term of this patent is extended or adjusted under 35 U.S.C. 154(b) by 0 days.

(21) Appl. No.: 16/172,567

(22) Filed: Oct. 26, 2018

(65) Prior Publication Data

US 2019/0061297 A1   Feb. 28, 2019

Related U.S. Application Data

(63) Continuation of application No. PCT/EP2017/000553, filed on May 4, 2017.

(30) Foreign Application Priority Data

May 4, 2016  (DE) .................. 10 2016 108 361

(51) Int. Cl.
   *B64D 11/04*  (2006.01)
   *B30B 9/22*  (2006.01)
   (Continued)

(52) U.S. Cl.
   CPC ............. *B30B 9/225* (2013.01); *B30B 9/305* (2013.01); *B30B 9/3007* (2013.01);
   (Continued)

(58) Field of Classification Search
   CPC ..... B30B 9/225; B30B 9/3057; B30B 9/3007; B30B 9/305; B30B 9/3039; B30B 9/3046; B64D 11/0007; B64D 11/04
   See application file for complete search history.

(56) References Cited

U.S. PATENT DOCUMENTS

| 3,275,393 A | 9/1966 | Stentz et al. |
| 4,444,099 A | 4/1984 | Paleschuck |

(Continued)

FOREIGN PATENT DOCUMENTS

| DE | 4120743 A1 | 1/1993 |
| DE | 19639123 C1 | 11/1997 |

(Continued)

OTHER PUBLICATIONS

German Patent Office,German Search Report for Application 102016108361.5 dated Feb. 20, 2017.

(Continued)

*Primary Examiner* — Nicolas A Arnett
(74) *Attorney, Agent, or Firm* — Lerner, David, Littenberg, Krumholz & Mentlik, LLP

(57) ABSTRACT

A system includes a vehicle monument, a hose with a fluid line, and an adapter with a triggering unit and a housing, which has a fluid connection. The fluid connection couples to a fluid mating connection, wherein the monument has a fluid main valve and a control unit for controlling the fluid main valve, an inlet of the fluid main valve couples to a fluid suction source, and a first end of the hose connects to the monument such that a first end of the fluid line is coupled to a first outlet of the fluid main valve. A second end of the hose is connected to the adapter such that a second end of the fluid line is coupled to the fluid connection, and the control unit controls the fluid main valve based on a triggering signal from the triggering unit.

16 Claims, 6 Drawing Sheets

(51) Int. Cl.
  *B30B 9/30* (2006.01)
  *B64D 11/00* (2006.01)

(52) U.S. Cl.
  CPC ......... *B30B 9/3039* (2013.01); *B30B 9/3046* (2013.01); *B30B 9/3057* (2013.01); *B64D 11/0007* (2013.01); *B64D 11/04* (2013.01)

(56) References Cited

U.S. PATENT DOCUMENTS

| | | | | |
|---|---|---|---|---|
| 5,465,660 | A * | 11/1995 | Conti | B30B 9/3003 100/100 |
| 6,223,361 | B1 * | 5/2001 | Rozenblatt | B64D 11/04 4/321 |
| 6,385,789 | B1 * | 5/2002 | Pondelick | B64D 11/04 4/427 |
| 6,453,481 | B1 * | 9/2002 | Pondelick | B64D 11/02 137/565.23 |
| 6,640,701 | B2 * | 11/2003 | Hoffjann | B30B 9/06 100/110 |
| 7,500,430 | B2 * | 3/2009 | Claflin | B30B 9/3039 100/100 |
| 9,003,967 | B2 * | 4/2015 | Reed | B30B 9/06 100/110 |
| 2005/0072324 | A1 | 4/2005 | Paleschuck | |
| 2011/0041282 | A1 * | 2/2011 | Smith | A47L 5/38 15/323 |
| 2012/0217343 | A1 | 8/2012 | Koschberg et al. | |
| 2013/0345651 | A1 | 12/2013 | Michaels et al. | |
| 2015/0190023 | A1 | 7/2015 | Nieschwitz et al. | |
| 2015/0343732 | A1 * | 12/2015 | Schliwa | B64D 11/04 100/90 |
| 2018/0134391 | A1 * | 5/2018 | Spille | B64D 11/0007 |

FOREIGN PATENT DOCUMENTS

| | | |
|---|---|---|
| DE | 102007018911 A1 | 10/2008 |
| DE | 102016108361 A1 | 11/2017 |
| EP | 2949459 A1 | 12/2015 |
| GB | 2485832 A | 5/2012 |
| WO | 2017190837 A1 | 11/2017 |

OTHER PUBLICATIONS

International Search Report, European Search Report for European Patent Application No. PCT/EP2017/000553, dated Sep. 9, 2017.

* cited by examiner

SYSTEM FOR EXTRACTING A FLUID BY SUCTION, AND A VEHICLE WITH A SYSTEM OF THIS TYPE

CROSS-REFERENCE TO PRIORITY APPLICATIONS

This application is a continuation of international patent application number PCT/EP2017/000553, having an international filing date of May 4, 2017, which claims priority to German patent application number DE 102016108361.5, having a filing date of May 4, 2016. The content of the referenced applications is incorporated by reference herein.

TECHNICAL FIELD

Embodiments of the invention relate to a system for extracting a fluid by suction, and a vehicle with a system of this type.

BACKGROUND

Systems for extracting a fluid by suction are known, in principle, from the prior art. A system of this type can have a fluid extraction source which is coupled to a fluid connection, for example. If a mating fluid connection is coupled to the fluid connection and is, in turn, connected to a container in which fluid has been collected, the fluid extraction source can be used to extract the fluid from the container by suction.

Patent document EP 2 949 459 A1 discloses a system having a cabin monument of a vehicle and a trolley. The trolley can be pushed into a receiving space of the cabin monument. A fluid connection is arranged on an interior wall of the cabin monument. The fluid connection is connected to a fluid suction source. The trolley has a mating fluid connection on a side wall. The mating fluid connection is connected to a waste bag in the trolley by means of a fluid line. The waste bag can be used to receive waste. Once this has taken place, the waste bag is closed, and the trolley is pushed into the receiving space of the cabin monument, wherein the mating fluid connection of the trolley is coupled to the fluid connection of the cabin monument. Fluid can then be extracted by suction through the two connections and then out of the interior of the waste bag in order to compact the waste bag and the waste collected therein.

In practice, it has been observed that the fixed arrangement of a fluid connection on the cabin monument and the fixed arrangement of a mating fluid connection on the trolley can have the disadvantage that the trolley has to be positioned in a particularly precise manner in the receiving space of the cabin monument in order to enable as fluid tight a link as possible between the fluid connection of the cabin monument and the mating fluid connection of the trolley to be ensured. In practice, therefore, it is envisaged that the trolley should be fixed in the receiving space of the cabin monument in order to ensure that the desired fluid tight link is continuously maintained between the fluid connection of the cabin monument and the mating fluid connection of the trolley, even during the suction process. Otherwise, unwanted noise emissions could arise.

BRIEF SUMMARY

It is the underlying object of the disclosure to provide a system for extracting fluid by suction which allows particularly simple coupling to a device, in particular a trolley, without the need for this purpose of precise positioning of the device and/or of the trolley.

According to a first aspect, the object is achieved by a system having the features of claim 1. Advantageous embodiments of the system and preferred embodiments are given in the associated dependent claims and in the following description.

A system for extracting a fluid by suction is proposed. The system has a cabin monument for a vehicle, a hose with a first fluid line, and an adapter with a triggering unit and a connection housing. The connection housing has a first fluid connection, wherein the first fluid connection of the connection housing is designed for coupling to a first mating fluid connection. The cabin monument has a controllable fluid main valve and a first control unit for controlling the fluid main valve. A first inlet of the fluid main valve is designed for at least indirect coupling to a fluid suction source. Furthermore, a first end of the hose is connected to the cabin monument in such a manner that a corresponding first end of the first fluid line is fluidically connected at least indirectly to a first outlet of the fluid main valve. A second end of the hose is connected to the adapter in such a manner that a corresponding second end of the first fluid line is fluidically connected at least indirectly to the first fluid connection. Furthermore, the first control unit is designed for controlling the fluid main valve at least indirectly on the basis of a triggering signal brought about by the triggering unit.

The system offers the advantage that the adapter is coupled to the cabin monument by means of the hose. The adapter has the connection housing with the first fluid connection. The hose is preferably elastically and/or flexibly deformable. If the first fluid connection is to be connected to a first mating fluid connection of a trolley, for example, the trolley can be pushed into the vicinity of the cabin monument. The adapter can then be brought into connection with the trolley in such a manner that a fluid link forms between the first fluid connection and the first mating fluid connection. For easier handling, the adapter can have a grip, in particular a handle. Here, the trolley does not necessarily have to be positioned at a precisely predetermined point relative to the cabin monument. This is because the hose allows the possibility of the trolley having to be positioned only in a predetermined area surrounding the cabin monument, for example. The surrounding area can be predetermined by a length of the hose. There is therefore no need for precise positioning of the trolley. Thus, coupling between the adapter and the trolley can be established in a particularly simple manner without the need for particularly precise positioning of the trolley relative to the cabin monument for this purpose.

The cabin monument is preferably configured as a kitchen cabin monument, in particular of an aircraft. The hose extends from the cabin monument to the adapter. Provision can furthermore be made for the hose to comprise a tubular sleeve, composed of plastic for example, preferably composed of a fiber-reinforced plastic, wherein the first fluid line extends through an interior of the tubular sleeve. The tubular sleeve and the first fluid line are preferably likewise flexibly and/or elastically deformable, in particular capable of elastic bending.

The first end of the hose is connected to the cabin monument. In this case, the link can be designed as a releasable link. In this way, the hose can be released from the cabin monument, especially for maintenance purposes. In this case, provision is preferably made for a first end of the first fluid line, which corresponds to the first end of the hose, to be fluidically connected to the first outlet of the fluid main valve. There should therefore be a fluid link between the first end of the first fluid line and the outlet of the fluid main valve. Here, the fluid main valve can be designed in the manner of a valve for shutting off, releasing and/or controlling a fluid via the valve. The first inlet of the fluid main valve can be coupled to a fluid suction source, in particular fluidically connected. If a vacuum is supplied by the fluid suction source, the corresponding vacuum can also be supplied by the first fluid line when the fluid main valve is opened. For this purpose, the first control unit is provided, which is designed for controlling the fluid main valve. Thus, the first control unit can be designed to control the fluid main valve in such a way that said valve is opened or closed by corresponding control signals.

The second end of the hose is connected to the adapter. In this case, the connection can be designed as a releasable connection. Thus, the hose and the adapter can be released from one another, in particular for maintenance purposes. A second end of the first fluid line, which corresponds to the second end of the hose, is preferably fluidically connected to the first fluid connection of the connection housing of the adapter. There should therefore be a fluid link between the second end of the first fluid line and the first fluid connection. If the abovementioned vacuum is applied to the first fluid line by opening the fluid main valve, the corresponding vacuum can also be supplied via the first fluid connection.

In order to ensure that a vacuum supplied by the first fluid connection is supplied only when required, in particular when the first fluid connection is coupled to the first mating fluid connection, the adapter has a triggering unit. In this case, the triggering unit can be arranged on or next to the grip of the adapter to enable the triggering unit to be actuated particularly easily. Actuation of the triggering unit causes the latter to bring about, that is to say preferably to generate a triggering signal. On the basis of the triggering signal, the control unit can control the fluid main valve accordingly. If the triggering signal represents the instruction to apply a vacuum to the first fluid connection, this can be evaluated by the control unit accordingly in order to send a corresponding control signal to the fluid main valve, with the result that the fluid main valve opens. If the first inlet of the fluid main valve is connected at least indirectly to the fluid suction source, a corresponding vacuum is thereby applied to the first fluid connection.

The system explained above offers the advantage that the adapter can be brought into connection in such a way with a trolley positioned in the vicinity of the cabin monument that the first fluid connection of the adapter is coupled to the first mating fluid connection of the trolley in order to establish a corresponding fluid link. Thereupon, the trigger button can be actuated, causing the fluid main valve to open, which can bring about the application of a vacuum to the first fluid connection. By virtue of the fluid link between the first fluid connection and the first mating fluid connection, the corresponding vacuum is also applied to the first mating fluid connection. On the trolley, the corresponding vacuum can be used to extract a fluid, in particular air and/or liquid, from the trolley by suction. This can preferably serve for the compaction of the waste container or the waste in the waste container. Once this has been accomplished, a corresponding triggering signal can be transmitted to the first control unit, e.g. by renewed actuation of the triggering unit, causing the fluid main valve of the cabin monument to close again. The adapter can then be decoupled from the trolley. The system explained above therefore offers particularly simple and convenient handling to enable fluid to be extracted by suction from a trolley, which preferably represents a device.

In an advantageous embodiment, the hose furthermore has a first signal line, wherein a first end of the first signal line, which is associated with the first end of the hose, is connected at least indirectly to the first control unit in terms of signal transmission, and wherein a second end of the first signal line, which corresponds to the second end of the hose, is connected at least indirectly to the triggering unit in terms of signal transmission.

The hose has the first fluid line and the first signal line. In this case, the hose can be formed by the first fluid line and the first signal line. The first signal line can extend through the interior of the tubular sleeve. The first signal line is preferably likewise flexibly and/or elastically deformable, in particular capable of elastic bending.

The triggering unit is preferably connected in terms of signal transmission to the second end of the first signal line, which corresponds to the second end of the hose. There should therefore be a signal link between the triggering unit and the second end of the first signal line. A first end of the signal line, which corresponds to the first end of the hose, is preferably connected to the first control unit in terms of signal transmission. There should therefore be a signal link between the first end of the first signal line and the control unit of the cabin monument. If a triggering signal is brought about by actuating the triggering unit, this signal is transmitted to the control unit of the cabin monument by means of the first signal line.

An advantageous embodiment of the system is characterized in that a receiving space which is at least substantially closed apart from an access opening is formed by the connection housing, and the first fluid connection is arranged on a wall of the receiving space which is, in particular, opposite the access opening. In this case, the receiving space can be formed at least substantially by the wall situated opposite the access opening and by a cylindrical casing wall extending from the aforementioned wall to the access opening. Here, the cross section of the casing wall is not necessarily circular. If the first fluid connection is arranged on the wall of the receiving space which lies opposite the access opening, the first fluid connection is accessible only from the receiving space. In other words, the first fluid connection is protected in a particularly effective manner from possible contamination and/or damage by the connection housing. In order to couple a first mating fluid connection to the first fluid connection, the first mating fluid connection should be pushed through the access opening into the receiving space until the first mating fluid connection strikes the first fluid connection in order to establish the corresponding fluid link between the first fluid connection and the first mating fluid connection.

Another advantageous embodiment of the system is characterized in that the connection housing has a guide, in particular having at least one guide element, at least one guide pin and/or at least one guide hole. The guide can be formed by the connection housing itself. Thus, for example, a guide hole and/or a guide pin can be arranged and/or formed on the wall of the receiving space which lies opposite the access opening. As an alternative or in addition, guide elements can be provided. These guide elements can be arranged radially on the inside on the casing wall of the connection housing, for example, said casing wall preferably extending from the wall situated opposite the access opening to the access opening. Radially on the inside, therefore, the casing wall can have at least one groove and/or at least one rail, which acts as a guide element of the connection housing. The guide of the connection housing preferably serves to guide a mating adapter, which has the first mating fluid connection. The mating adapter can be designed to be pushed into the receiving space of the connection housing. In this case, the first mating fluid connection is preferably arranged on an end face of the mating adapter, with the result that, as the mating adapter is pushed into the receiving space, the first mating fluid connection strikes the first fluid connection. Provision can furthermore be made for the mating adapter to have a guide corresponding to the guide of the connection housing. Thus, the guide of the mating adapter can engage in the guide of the connection housing when the mating adapter is pushed into the receiving space of the connection housing. The connection housing can be designed to releasably hold and/or releasably fix the mating adapter in the receiving space. For this purpose, holding and/or fixing means can be provided for the connection housing and/or corresponding holding and/or fixing means can be provided for the mating adapter, thus enabling the mating adapter to be held and/or fixed releasably in the receiving space of the connection housing. An actuating element, which is designed for releasing the mating adapter from the adapter, can be arranged on the adapter, in particular on or next to the associated grip.

Another advantageous embodiment of the system is characterized in that the access opening of the connection housing is assigned an automatically closing flap, which is designed to be movable, in particular pivotable, between an open position and a closed position. The flap is preferably designed in such a way that it at least substantially closes the access opening in the closed position. Moreover, the flap is preferably designed in such a way that it at least partially or at least substantially exposes the access opening in the open position. For this purpose, the flap can be secured on the connection housing by means of a joint and/or of a linear guide. Thus, for example, the flap can be secured rotatably or pivotably on the connection housing by means of a hinge joint. Moreover, a spring mechanism can be provided, which acts with a corresponding spring force on the flap, thus moving or pivoting the flap automatically into the closed position. In order to move or pivot the flap into the open position, the flap can be pushed open manually from the outside. This can be performed in such a way, for example, that the mating adapter is pressed against the flap from the outside, with the result that the flap moves inward or pivots inward and thereby exposes the access opening, the flap thus being in the open position. The mating adapter can thereupon be pushed as far as that wall of the receiving space which lies opposite the access opening, with the result that the second mating fluid connection strikes the first mating fluid connection. Once a corresponding fluid link has been established between the first fluid connection and the second mating fluid connection, corresponding extraction of fluid by suction can take place. The mating adapter can thereupon be pulled out of the receiving space again. By means of the spring mechanism, the flap then moves or pivots back into the closed position. The flap explained above offers the advantage that the receiving space and/or the first fluid connection is protected in a particularly effective manner from contamination and/or damage. If a small quantity of liquid escapes as the first fluid connection is separated from the first mating fluid connection, the receiving space of the connection housing can be configured in such a way that a quantity of fluid, in particular a correspondingly small quantity of fluid, can be retained therein. This effectively prevents fluid from entering the surroundings unhindered. This is advantageous particularly when the fluid is waste water.

Another advantageous embodiment of the system is characterized in that the adapter has a controllable fluid secondary valve, which is coupled between the first fluid connection of the connection housing and the second end of the fluid line, and the adapter has a second control unit for controlling the fluid secondary valve, wherein the second control unit is designed for controlling the fluid secondary valve at least indirectly on the basis of a triggering signal brought about by the triggering unit. Here, the fluid secondary valve can be designed in the manner of a valve for shutting off, releasing and/or controlling a fluid via the valve. In this case, the second control unit is preferably designed in such a way for controlling the fluid secondary valve that it can open or close the fluid secondary valve. If a triggering signal is brought about by the triggering unit, this can be transmitted directly or at least indirectly to the second control unit. For this purpose, a corresponding signal link can be provided between the triggering unit and the second control unit. As an alternative or in addition, it is possible for the triggering signal brought about by the triggering unit first of all to be sent to the first control unit of the cabin monument. Provision can furthermore be made here for the first control unit of the cabin monument to be connected to the second control unit of the adapter by means of the first signal line, thus allowing the first control unit to send a signal corresponding to the triggering signal to the second control unit. This signal is thus based at least indirectly on the triggering signal of the triggering unit. If the triggering unit is then actuated, bringing about the corresponding triggering signal, the fluid secondary valve can be opened by means of the second control unit, and the fluid main valve can be opened by means of the first control unit, with the result that a vacuum supplied by the fluid suction source can be applied to the first fluid connection. As an alternative, the triggering signal can be used to close the fluid main valve and the fluid secondary valve. The fluid secondary valve offers the advantage that a fluid-carrying link between the first fluid connection and the first fluid line can be interrupted and/or established in immediate proximity to the first fluid connection. If, during extraction by suction, liquid is extracted by means of the first fluid connection, the fluid secondary valve can ensure that the fluid secondary valve is closed after the ending of extraction in order effectively to prevent or reduce to a minimum any backflow of liquid through the first fluid connection. This is of particular advantage especially when wastewater is extracted by means of the first fluid connection, wherein, in this case, wastewater should be prevented from flowing back through the first fluid connection and possibly entering the surroundings. Since the controllable fluid secondary valve effectively prevents or reduces to a minimum a corresponding backflow, extraction of fluid, in particular wastewater, by means of the system can take place in a particularly hygienic manner.

Another advantageous embodiment of the system is characterized in that the adapter has a sensor, which is designed for detecting a predetermined arrangement of a mating fluid connection in the receiving space and/or at the first fluid connection of the connection housing, wherein the first control unit is designed for controlling the fluid main valve, and/or the second control unit is designed for controlling the fluid secondary valve, in each case at least indirectly on the basis of a sensor signal of the sensor and of a triggering signal brought about by the triggering unit. The sensor is preferably formed on or is integral with the connection housing of the adapter. Thus, the adapter can be designed for detecting a predetermined arrangement of a mating fluid connection. Thus, the sensor can detect whether the mating fluid connection is positioned in the receiving space in accordance with a predetermined arrangement and/or whether the mating fluid connection is arranged on or resting against the first fluid connection of the connection housing. Here, detection of the predetermined arrangement of the mating fluid connection can be performed indirectly. If, for example, a mating adapter has the mating fluid connection, the sensor can infer the arrangement of the mating fluid connection and thus detect the arrangement of the mating fluid connection by detecting the mating adapter. The predetermined arrangement of the mating fluid connection is preferably characterized in that the mating fluid connection is coupled to the first fluid connection in such a way that a fluid link is formed between the first fluid connection and the mating fluid connection. The mating fluid connection is preferably a first mating fluid connection. If the predetermined arrangement of the mating fluid connection is present and it is detected by the sensor, the sensor can send a corresponding sensor signal to the first and/or second control unit. In this way, the information that the fluid link between the first fluid connection and the mating fluid connection has been established is transmitted to the first and/or second control unit. This then allows corresponding extraction of fluid by suction by means of the first fluid connection and the mating fluid connection without causing troublesome suction noises. To ensure that extraction does not begin before the fluid link between the first fluid connection and the mating fluid connection has been established, the first and/or second control unit are designed to open the fluid secondary valve and the fluid main valve only when the sensor signal of the sensor represents the abovementioned established fluid link between the first fluid connection and the mating fluid connection. Referring to the above explanations, control of the fluid secondary valve and/or the fluid main valve can furthermore be dependent on the triggering signal of the triggering unit. If, for example, the corresponding fluid link is detected and correspondingly signaled by the sensor, the opening of the fluid secondary valve and/or of the fluid main valve takes place only when the triggering unit is actuated.

Another advantageous embodiment of the system is characterized in that the connection housing has a further, second fluid connection, the second fluid connection of the connection housing is designed for coupling to a second mating fluid connection, the second fluid connection is arranged on the wall of the receiving space, in particular the wall opposite the access opening, a first inlet of the fluid secondary valve is fluidically connected at least indirectly to the second end of the first fluid line, a first outlet of the fluid secondary valve is fluidically connected at least indirectly to the first fluid connection, a second outlet of the fluid secondary valve is fluidically connected at least indirectly to the second fluid connection, and the fluid secondary valve can be controlled in such a way that the first inlet of the fluid secondary valve is coupled either to the first outlet of the fluid secondary valve or to the second outlet of the fluid secondary valve. By means of the at least indirect fluid link between the first inlet of the fluid secondary valve and the second end of the first fluid line, a vacuum supplied by the fluid suction source can be applied to the first inlet of the fluid secondary valve. Moreover, an at least indirect fluid link is provided between the first outlet of the fluid secondary valve and the first fluid connection. If the fluid valve is then controlled in such a way that the first inlet of the fluid secondary valve is coupled to the first outlet of the fluid secondary valve, a vacuum supplied by the fluid suction source can be applied to the first outlet or to the first fluid connection. Moreover, an at least indirect fluid link is provided between the second outlet of the fluid secondary valve and the second fluid connection. If the fluid valve is then controlled in such a way that the first inlet of the fluid secondary valve is coupled to the second outlet of the fluid secondary valve, a vacuum supplied by the fluid suction source can be applied to the second outlet of the fluid secondary valve or to the second fluid connection. As a particular preference, the fluid valve is designed in the manner of a three/two-way valve. Thus, the first inlet of the fluid secondary valve can be coupled either to the first or the second outlet of the fluid secondary valve. Provision can furthermore be made for the fluid secondary valve to be controllable in such a way that none of the outlets is coupled to the first inlet of the fluid secondary valve. Provision is furthermore preferably made for the second control unit to be able to control the fluid secondary valve in such a way as to couple the first inlet of the fluid secondary valve to the first outlet of the fluid secondary valve, to the second outlet of the fluid secondary valve or to none of the outlets of the fluid secondary valve. Since the connection housing preferably has the first and the second fluid connection, the adapter offers the advantage that fluid can be extracted by suction from different mating fluid connections, i.e. the first mating fluid connection or the second mating fluid connection, by means of the system. The mating adapter preferably has the first and the second mating fluid connection. If the mating adapter is pushed into the receiving space of the connection housing of the adapter, provision is preferably made for the first mating fluid connection to form a fluid link to the first fluid connection and for the second mating fluid connection to form a fluid link to the second mating fluid connection. If the mating adapter is formed on a trolley for the separate collection of liquid waste and solid waste, for example, the first mating fluid connection can be coupled to a liquid chamber of the trolley for the reception of liquid waste, and the second mating fluid connection can be coupled to a solids chamber of the trolley for the reception of solid waste. In this case, the fluid secondary valve can be controlled in such a way that the first outlet of the fluid secondary valve is coupled first of all to the first inlet of the fluid secondary valve in order to extract liquid by suction from the liquid chamber. After this, the fluid secondary valve can be controlled in such a way that the second outlet of the fluid secondary valve is coupled to the first inlet of the fluid secondary valve, causing air to be extracted from the solids chamber. For this purpose, the solids chamber of the trolley can be closed fluid tightly beforehand. Once this has been done, the extraction of air by suction from the solids chamber can bring about compaction of the solid waste in the solids chamber. Once the extraction of the air and compaction of the solid waste has been completed, the fluid secondary valve can be controlled in such a way that none of the outlets of the fluid secondary valve is coupled to the first inlet of the fluid secondary valve. The adapter can then be separated from the mating adapter.

An advantageous embodiment of the system is characterized in that the cabin monument has a receiving device for the releasable reception of the adapter. If, as explained in relation to the previous embodiment, the adapter is separated from the trolley, for example, the adapter can then be introduced or inserted into the receiving device of the cabin monument. For this purpose, the receiving device can be formed by the cabin monument in the form of a recess or of an externally accessible chamber. The cabin monument or the receiving device can be designed to hold and/or to fix the adapter releasably. In this way, the adapter is prevented in a reliable manner from accidentally falling out of the receiving device. Since the adapter preferably has the connection housing with the first and/or the second fluid connection, the receiving device of the cabin monument offers a particularly suitable space for protecting the adapter from contamination, damage and/or unwanted access. Thus, provision can be made for the adapter to be releasably receivable by the receiving device in such a way that the receiving space of the connection housing of the adapter is not accessible from the outside.

An advantageous embodiment of the system is characterized in that the cabin monument has a rinsing device for rinsing the connection housing, in particular the associated receiving space. The rinsing device can have at least one spray nozzle, for example, which is designed for dispensing rinsing liquid into the receiving space of the connection housing. As a particular preference, the rinsing device is assigned to and/or formed integrally with the receiving device. In this case, the adapter can be introduced into the receiving device in such a way that it is held and/or fixed there releasably and the adapter is arranged in such a way relative to the rinsing device that rinsing can be performed by dispensing rinsing liquid into the receiving space of the connection housing. As a particular preference, the adapter can be introduced into the receiving device again after each use for extracting fluid, enabling rinsing of the receiving space then to take place. In this case, the use of the adapter is particularly hygienic since possible droplet quantities of extracted liquid which have possibly accumulated in the receiving space can be removed by means of the rinsing process.

Another advantageous embodiment of the system is characterized in that the cabin monument has a hose retraction device for the hose, which is designed for the automatic retraction, in particular winding up, of the hose. This embodiment offers the advantage that the hose can be retracted into or onto the cabin monument by means of the hose retraction device after the extraction of fluid, ensuring that the hose does not present an obstacle in the immediate vicinity of the cabin monument during a phase in which the system is not being used to extract fluid. A particularly advantageous embodiment of the hose retraction device is configured in the manner of a hose winding device which is designed for automatically winding up the hose. When required, the hose can therefore be unwound, thus enabling the adapter to be connected to a mating adapter in order to start a fluid extraction process. The adapter can then be separated from the mating adapter, enabling the hose, which extends from the cabin monument to the adapter, to be pulled back in and, in the process, wound up by the hose retraction device.

An advantageous embodiment of the system is characterized in that the fluid secondary valve has a second inlet, which is fluidically connected at least indirectly to a vent connection of the adapter, and the fluid secondary valve is designed to be controllable in such a way that the second inlet of the fluid secondary valve is coupled to the first outlet of the fluid secondary valve or the second outlet of the fluid secondary valve in the reverse way to the first inlet of the fluid secondary valve. By virtue of the fluid link between the vent connection of the adapter and the second inlet of the fluid secondary valve, air can flow from the surroundings of the adapter to the second inlet via the vent connection. Here, the second inlet of the fluid secondary valve is coupled to the second outlet of the fluid secondary valve when the first inlet of the fluid secondary valve is coupled to the first outlet of the fluid secondary valve. Moreover, provision is made for the second inlet of the fluid secondary valve to be coupled to the first outlet of the fluid secondary valve when the first inlet of the fluid secondary valve is coupled to the second outlet of the fluid secondary valve. The fluid secondary valve is preferably designed in the manner of a 4/2-way valve. The second control unit is preferably designed for controlling the fluid secondary valve as explained above. Moreover, provision can be made for the fluid secondary valve to be controllable in such a way that none of the outlets is coupled to any of the inlets. The abovementioned embodiment of the system offers the advantage that fluid can be extracted and ambient air can be supplied in return. This can be advantageous, for example, if the mating adapter is assigned to a trolley with a pneumatic compaction device, wherein the compaction device requires both a vacuum and ambient air to compact waste collected in the trolley.

An advantageous embodiment of the system is characterized in that the system has a trolley with a pneumatic compaction device, wherein the trolley has a waste bag receiving space, in which a waste bag for collecting waste is arranged, and wherein the trolley has the first mating fluid connection, which is fluidically connected at least indirectly to the compaction device. By virtue of the fluid link between the first mating fluid connection and the compaction device, the compaction device can be supplied with a vacuum when the first mating fluid connection is brought into fluid communication with the first fluid connection. The compaction device is preferably designed to compact the waste bag and/or the waste in the waste bag when a vacuum is supplied to the pneumatic compaction device. In a variant embodiment, the compaction device can have a compaction bag, which forms the waste bag receiving space, and wherein the compaction bag can be airtightly closed apart from a bag connection, wherein the bag connection is formed in fluid communication with the first mating fluid connection. If a vacuum is then applied to the first mating fluid connection, fluid, in particular air is extracted from the compaction bag, reducing the interior space of the compaction bag and leading to compression and/or compaction of the waste bag and hence also to compaction of the collected waste in the waste bag. Further possible embodiments of the pneumatic compaction device are conceivable and possible.

An advantageous embodiment of the system is characterized in that the compaction device has a pneumatically extendable and retractable bellows for compacting the waste bag, wherein the trolley is designed, by means of the compaction device, to extend the bellows for compaction of the waste bag when a vacuum is applied to the first mating fluid connection. For this purpose, the compaction device can have a lid, on the underside of which the bellows is arranged. When the lid is connected to the waste bag receiving space in such a way that the lid closes off the waste bag receiving space fluid tightly apart from an extraction passage in the lid, wherein the extraction passage is arranged radially on the outside relative to the bellows and is in fluid communication with the first mating fluid connection, air and/or fluid can be extracted from the waste bag receiving space by applying a vacuum to the first mating fluid connection. This causes a force on the bellows which leads to the expansion of the bellows. When the bellows is extended, it impinges upon the waste bag and compacts it as well as the waste collected therein.

Another advantageous embodiment of the system is characterized in that the trolley has the second mating fluid connection, which is fluidically connected at least indirectly to the compaction device, and the trolley is designed, by means of the compaction device, to retract the bellows when a vacuum is applied to the second mating fluid connection.

An advantageous embodiment of the system is characterized in that the trolley has the second mating fluid connection, which is fluidically connected at least indirectly to a bellows interior of the bellows. If the fluid secondary valve is controlled in such a way, for example, that a vacuum is applied to the first mating fluid connection and the second mating fluid connection is connected to the ambient air, ambient air can flow into the bellows interior when the bellows is extended. If, on the other hand, the fluid secondary valve is controlled in such a way that a vacuum is applied to the second mating fluid connection and the first mating fluid connection is connected to the ambient air, air can be extracted from the bellows interior, giving rise to a vacuum in the bellows interior. This causes a force on the bellows which leads to the retraction of the bellows. Corresponding to this, ambient air can flow through the first mating fluid connection into the waste bag receiving space, making it particularly easy to retract the bellows.

According to another aspect of the disclosure, the object stated at the outset can be achieved by means of a vehicle, in particular an aircraft, wherein the vehicle has a system of the kind described above.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Further features, advantages and possible applications of the present disclosure will be found in the following description of the illustrative embodiments and the figures. In this context, all the features described and/or illustrated in themselves and in any desired combination form the subject matter of the disclosure, irrespective of their combination in the individual claims or the dependency references thereof. In the figures, identical reference signs furthermore indicate identical or similar objects.

DETAILED DESCRIPTION

Figure 1:
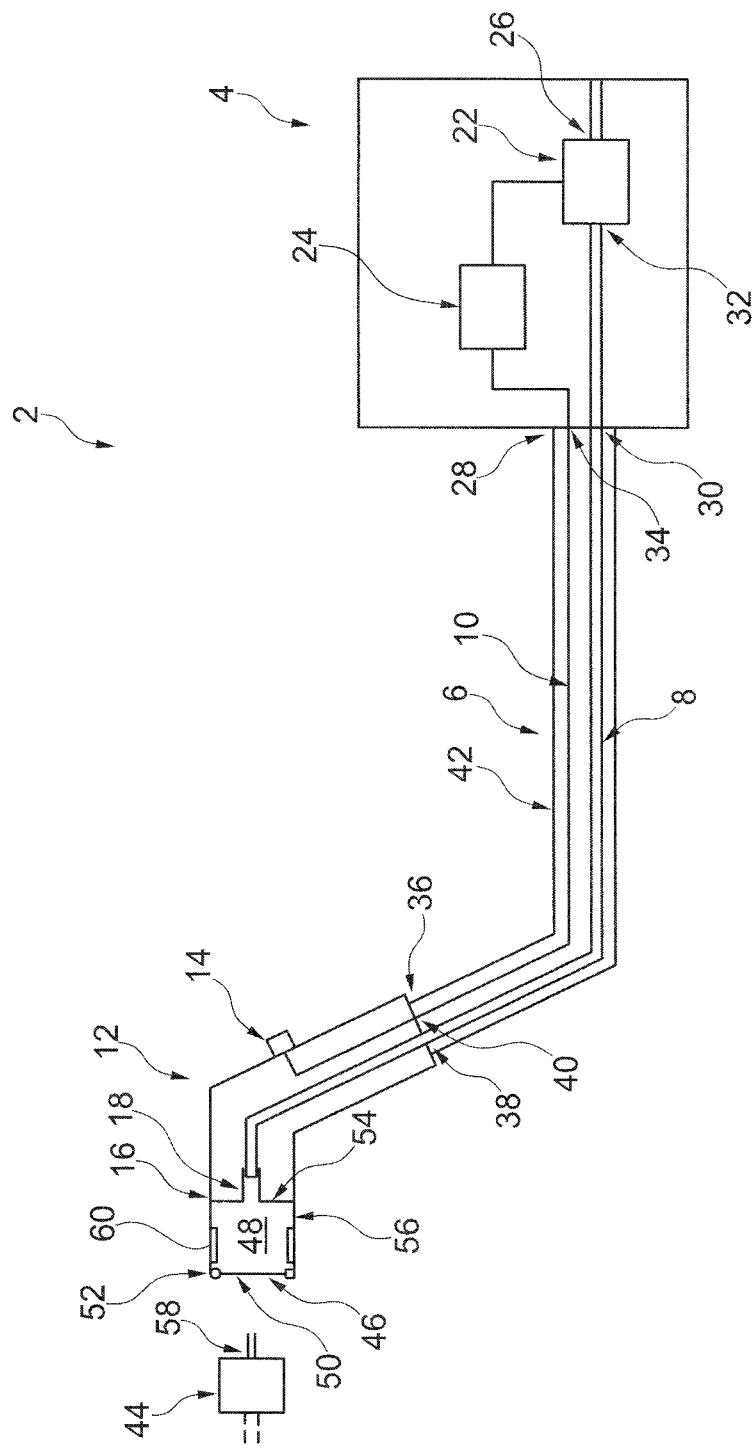
FIG. 1 shows an illustrative embodiment of the system in a schematic illustration.

An advantageous embodiment of the system 2 is illustrated schematically in FIG. 1. The system 2 is used to extract fluid by suction. The system 2 has a cabin monument 4. The cabin monument 4 can be a kitchen cabin monument, in particular of an aircraft, for example. Moreover, the system 2 has a hose 6, which comprises a first fluid line 8 and a first signal line 10. For this purpose, the hose 6 can have a tubular sleeve 42, through which the first fluid line 8 and the first signal line 10 extend. As an alternative, provision can be made for the hose 6 to be at least partially formed by the first fluid line 8 and the first signal line 10. The hose 6 and thus the first fluid line 8 and the first signal line 6 extend from an adapter 12 of the system 2 to the cabin monument 4. The adapter 12 is used for coupling to a mating adapter 44, which is illustrated schematically in FIG. 1. The mating adapter 4 can be assigned to a further device (not illustrated). The adapter 12 of the system 2 has a connection housing 16 with a first fluid connection 18. For this purpose, the connection housing 16 can form a receiving space 48 which is at least substantially closed, apart from an access opening 46. In this arrangement, the access opening 46 is preferably assigned an automatically closing flap 50. The flap 50 can be secured in a rotatably mounted manner on an access-opening end of the connection housing 16 by means of a hinge joint 52. Thus, the flap 50 can be pivoted between a closed position, in which the flap 50 at least substantially closes the access opening 46, and an open position, in which the flap 50 at least partially exposes the access opening 46. FIG. 1 shows the case in which the flap 50 is in the closed position. Moreover, provision is preferably made for the first fluid connection 18 to be arranged on a wall 54 of the receiving space 48 which is situated opposite the access opening 46. In order to form the receiving space 48, a further, cylindrical wall 56, which is also referred to as the casing wall 56, preferably extends from the abovementioned wall 54 to the access opening 46.

In order to connect the mating adapter 44 to the adapter 12, the mating adapter 44 is pushed into the receiving space 48. During this process, the mating adapter 44 first of all impinges upon the flap 50 and pushes the latter open. The hinge joint 52 is preferably assigned a spring mechanism, which is designed to hold the flap 50 preferentially in the closed position. However, the flap can also be pivoted into the open position by virtue of the spring mechanism, this being made possible by pushing the mating adapter 44 into the receiving space 48. The mating adapter 44 preferably has a first mating fluid connection 58. The first fluid connection 18 of the adapter 12 is preferably designed in such a way that the first mating fluid connection 58 can be coupled to the first fluid connection 18. This takes place when the mating adapter 44 is pushed with the first mating fluid connection 58 in the lead into the receiving space 48 as far as the wall 54 or the first fluid connection 18. This brings about the coupling between the first fluid connection 18 and the first mating fluid connection 58, giving rise to a corresponding fluid link.

Moreover, provision is made for the adapter 12 to be coupled to the cabin monument 4 by means of the hose 6. During this process, a first end 28 of the hose 6 is coupled to the cabin monument 4 in such a manner that a corresponding first end 30 of the first fluid line 18 is fluidically connected at least indirectly to a first outlet 32 of a fluid main valve 22 of the cabin monument 4. To establish the corresponding fluid link, a further fluid line can be provided, which extends from the outlet 32 of the fluid main valve 22 to the first end 30 of the first fluid line 8. A first inlet 26 of the fluid main valve 22 can be connected at least indirectly to a fluid extraction source (not illustrated). The fluid extraction source can preferably be assigned to the cabin monument 44. As an alternative it is possible for the fluid extraction source to be assigned to the vehicle. A vacuum can be supplied by the fluid extraction source. When the fluid main valve 22 opens, a corresponding vacuum can also be transmitted to the first fluid line 8. Here, provision is made for a second end 36 of the hose 6 to be connected to the adapter 12 in such a manner that a corresponding second end 38 of the first fluid line 8 is fluidically connected at least indirectly to the first fluid connection 18. For this purpose, the adapter 12 can have at least one further fluid line, which extends from the first fluid connection 18 to the second end 38 of the first fluid line 8. If the abovementioned vacuum is applied to the first fluid line 8, a corresponding vacuum can be applied to the first fluid connection 18 by means of the abovementioned fluid link between the first fluid line 8 and the first fluid connection 18. When the first fluid connection 18 is coupled to the first mating fluid connection 58, said vacuum can be supplied to the mating adapter 44 in order to extract this fluid.

However, continuous application of a vacuum to the first fluid connection 18 is not advantageous. This causes a corresponding power requirement and will furthermore cause unpleasant noise. In order to apply a corresponding vacuum to the first fluid line 8 only when required, the fluid main valve 22 of the cabin monument 4 is provided. Moreover, the cabin monument 4 has a first control unit 24, which is designed for controlling the fluid main valve 22. For this purpose, the first control unit 24 can be connected to the fluid main valve 22 by means of a signal line in order to transmit corresponding control signals to said valve, allowing control of the fluid main valve 22 by means of the first control unit 24.

In order to indicate the requirement for a vacuum, the adapter 12 has a triggering unit 14. Here, the second end of the hose 6 is connected to the adapter 12 in such a manner that a corresponding second end 40 of the first signal line 10 is connected at least indirectly to the triggering unit 14 in terms of signal transmission. In an advantageous embodiment, a further signal line extends from the triggering unit 14 to the second end 40 of the first signal line 10. Moreover, provision is made for the first end 28 of the hose 6 to be connected to the cabin monument 4 in such a manner that a corresponding first end 34 of the first signal line 10 is connected at least indirectly to the first control unit 24 of the cabin monument 4 in terms of signal transmission. For this purpose, the cabin monument 4 can have a further signal line, which extends from the first end 34 of the first signal line 10 to the first control unit 24. If the triggering unit 14 is actuated, it can be designed to bring about a corresponding triggering signal, which is transmitted to the first control unit 24 by means of the abovementioned signal link between the triggering unit 14 and said control unit. Thus, the first control unit 24 obtains information that a vacuum is to be applied to the first fluid line 8, for example. Thereupon, the first control unit 24 controls the fluid main valve 22 of the cabin monument 24 accordingly, with the result that the fluid main valve 22 opens. Thus, the system 2 explained above allows extraction of fluid by suction.

The system 2 offers the advantage that the adapter 12 can be handled in a particularly simple and flexible manner. This is because the adapter 12 is not arranged directly with the cabin monument 4 but the hose 6 extends between the cabin monument 4 and the adapter 12. The hose 6 and, in particular, the associated first fluid line 8 as well as the associated first signal line 10 are preferably of elastically deformable and/or bendable design. Thus, the adapter 12 can be moved substantially freely in a range predetermined by the hose length of the hose 6. If the adapter 12 is then to be coupled to the mating adapter 44, which is preferably assigned to a cart, in particular a trolley, the cart or the trolley should be moved with the mating adapter 44 into the vicinity of the cabin monument 4. Precise positioning of the cart or trolley is not necessary since, as explained above, the adapter 12 can be moved relative to the cabin monument 4. Thus, the adapter 12 can be attached to the mating adapter 44 in that the mating adapter 44 reaches into the receiving space 48. Thereupon, the fluid can be extracted by suction by actuating the triggering unit 14. Once the extraction of fluid is complete, the triggering unit 14 can be actuated again in order to close the main valve 22, thus allowing the adapter 12 to be separated from the mating adapter 44. As the adapter 12 is pulled off the mating adapter 44, the flap 50 closes automatically, thus effectively preventing any small quantities of extracted fluid that may possibly emerge from entering the surroundings. Moreover, this effectively prevents the person who is handling the adapter 12 and/or the triggering unit 14 from accidentally coming into contact with said small quantity of fluid.

Moreover, provision is preferably made for the connection housing 16 to have a guide 60. The guide 60 is used to guide the mating adapter 44. The mating adapter 44 can have a guide designed to correspond thereto, with the result that the guides 60 engage in one another when the mating adapter 44 is pushed into the receiving space 48. The guide 60 of the connection housing 16 can be formed by guide elements arranged radially on the inside of the casing wall 56. Other guide elements, e.g. guide pins and/or guide holes, can likewise or alternatively be provided in order to form the guide 60 of the connection housing 16.

Figure 2:
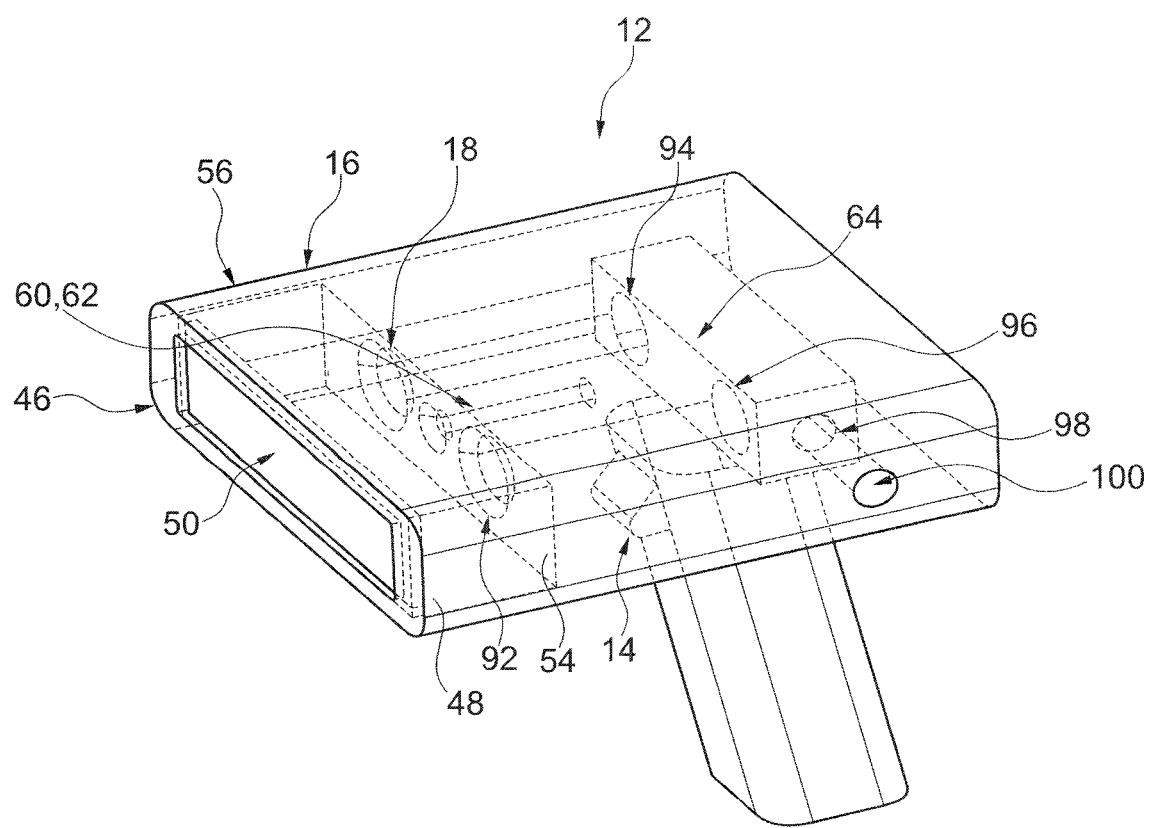
FIG. 2 shows an illustrative embodiment of the adapter in a schematic, semitransparent illustration.

In FIG. 2, the adapter 12 is illustrated in a semitransparent perspective view. The adapter 12 illustrated in FIG. 2 is one of a multiplicity of possible variant embodiments for the adapter 12. As illustrated in FIG. 2, the adapter 12 preferably has a grip, in particular a handle. The grip is connected to the connection housing 16 and/or formed integrally with the connection housing 16. Moreover, an alternative variant of the guide 60 of the connection housing 16 is illustrated in the figure. In this case, the guide 60 is formed by a guide hole 62 in the wall 56 situated opposite the access opening 46. For this purpose, the mating adapter 44 can have a guide pin (not illustrated), which reaches into the guide hole 62 when the mating adapter 44 is pushed into the receiving space 48, thus making it possible to ensure precise positioning of the mating adapter 44 relative to the adapter 12 and to the connection housing 16. The precise positioning of the mating adapter 44 as it is pushed into the receiving space 48 ensures that the first fluid connection 18 of the adapter 12 is brought into connection with the first mating fluid connection 58 of the mating adapter 44 in such a manner that a fluid link is reliably established between the first fluid connection 18 and the first mating fluid connection 58.

Figure 3:
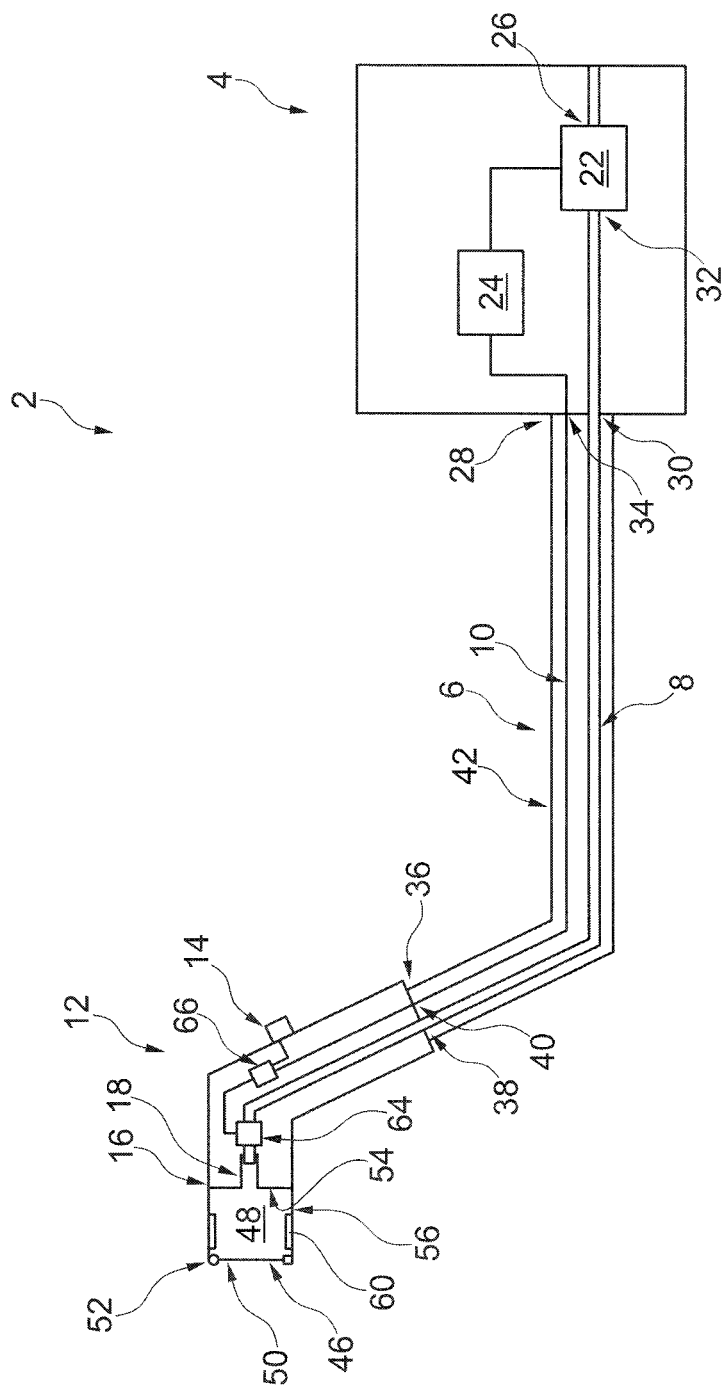
FIG. 3 shows another illustrative embodiment of the system in a schematic illustration.

An advantageous embodiment of the system 2 is illustrated in FIG. 3. In this case, attention is drawn in analogous fashion to the preceding explanations, advantageous embodiments, effects and/or advantages explained. The adapter 12 of the system 2 has a controllable fluid secondary valve 64. The fluid secondary valve is designed in the manner of a controllable fluid valve. The fluid secondary valve 64 is coupled between the first fluid connection 18 and the second end 38 of the first fluid line 8. For this purpose, the adapter 12 can have a further fluid line, which extends from the second end 38 of the first fluid line 8 to an inlet of the fluid secondary valve 64. An outlet of the fluid secondary valve 64 can be coupled directly to the first fluid connection 18. As an alternative, it is possible for a further fluid line to be provided, which extends from the outlet of the fluid secondary valve 64 to the first fluid connection 18.

Furthermore, the adapter 12 has a control unit, which is referred to as the second control unit 66. The second control unit 66 is connected by means of a signal line to the fluid secondary valve 64, thus enabling the fluid secondary valve 64 to be controlled by the second control unit 66. In this case, the second control unit 66 can control the fluid secondary valve 64 in such a way that the fluid secondary valve 64 opens or closes. Moreover, the second control unit 64 is designed for controlling the fluid secondary valve 64 at least indirectly on the basis of a triggering signal brought about by the triggering unit 14. In this case, the triggering unit 14 can be connected by means of a further signal line to the second control unit 66 in order to transmit the triggering signal from the triggering unit 14 to the second control unit 66. If the triggering unit 14 is then actuated, a corresponding triggering signal is brought about by the triggering unit and transmitted to the second control unit 66. The second control unit 66 can transmit a corresponding signal to the first control unit 24 since the second control unit 66 is furthermore preferably connected by means of a further signal line to the second end 40 of the first signal line 10. On the basis of the triggering signal, the second control unit 66 can control the fluid secondary valve 64 in such a way that it opens, for example. Since the first control unit 24 of the cabin monument 4 has received corresponding information, the fluid main valve 22 of the cabin monument 4 can be controlled in such a way by the first control unit 24 that the fluid main valve 22 also opens. Thus, a vacuum supplied by a fluid suction source can be applied to the first fluid connection 18. In this context, attention is drawn to the preceding sections for corresponding explanations, effects and advantages.

Figure 4:
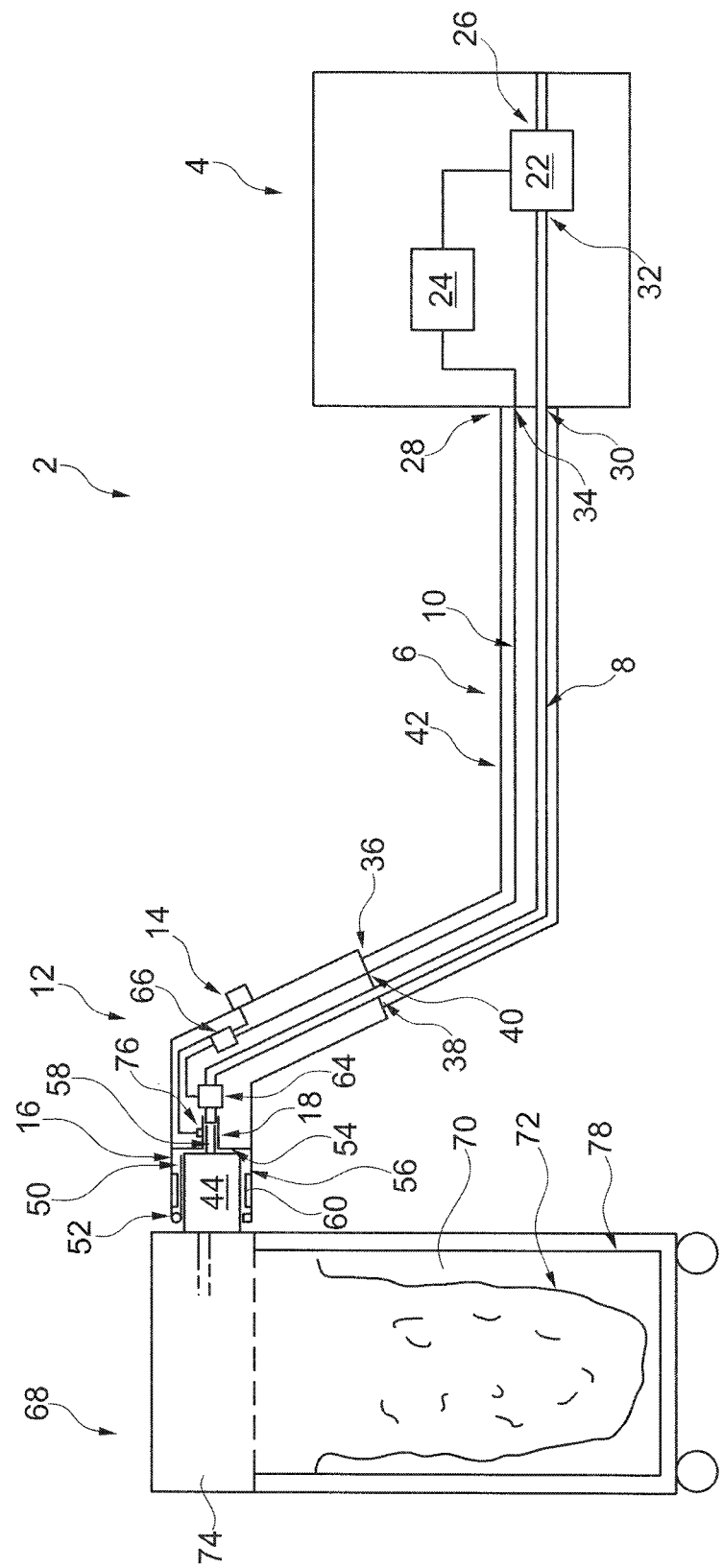
FIG. 4 shows another illustrative embodiment of the system in a schematic illustration.

Another advantageous variant embodiment of the system 2 is illustrated in FIG. 4. For this purpose, the system 2 can have a trolley 68. The trolley 68 can be designed in the manner of a cart. The trolley 68 preferably has rollers on an underside, allowing the trolley 68 to be pushed and/or pulled. The trolley 68 is used to collect waste. For this purpose, the trolley 68 has a waste bag receiving space 70. A waste bag 72, in particular an interchangeable waste bag 72, for receiving and/or collecting waste can be arranged in the waste bag receiving space 70. Furthermore, the trolley 68 has a pneumatic compaction device 74. This is preferably intended to mean that the compaction device 74 is pneumatically actuatable and/or controllable. The compaction device 74 is connected at least indirectly to a first mating fluid connection 58 of the trolley 68. For this purpose, the trolley 68 can have the mating adapter 44, on which the first mating fluid connection 58 is arranged. Thus, a fluid link can extend from the first mating fluid connection 58 to the compaction device 74. The compaction device 74 is designed for compacting, in particular for compressing and/or squeezing, the waste bag 72 in the waste bag receiving space 70, when the compaction device 74 is supplied with a vacuum. In order to supply the compaction device 74 with a corresponding vacuum, the trolley 68 can be moved into the vicinity of the cabin monument 4. Thereupon, the adapter 12 is brought into connection with the mating adapter 44 in such a way that the mating adapter 44 reaches into the receiving space 48 of the connection housing 16 of the adapter 12, more specifically in such a way that the first mating fluid connection 58 is brought into fluid communication with the first fluid connection 18.

Moreover, provision is preferably made for the adapter 12 to have a sensor 76. The sensor 76 is designed for detecting a predetermined arrangement of the mating fluid connection 58 in the receiving space 48 and/or on the first fluid connection 18 of the adapter 12. The sensor 76 is connected to the second control unit 66 by means of the further signal link. If the abovementioned predetermined arrangement of the first mating fluid connection 58 is detected by the sensor 76, the sensor sends a corresponding sensor signal, which represents the predetermined detected arrangement of the first mating fluid connection 58, to the second control unit 66. The second control unit 66 can send a corresponding signal to the first control unit 24, which likewise represents the detected predetermined arrangement of the first mating fluid connection 58. Thus, both control units 66, 24 can obtain the information from the sensor 76 that the first mating fluid connection 58 is in a predetermined arrangement in the receiving space 48 and/or on the first fluid connection 18. In this case, the first control unit 24 is preferably designed in such a way for controlling the fluid main valve 22 that the main valve 22 is controlled at least indirectly on the basis of the sensor signal of the sensor 76 and preferably of a triggering signal brought about by the triggering unit 14. Similarly, the second control unit 66 is preferably designed in such a way for controlling the fluid secondary valve 64 that the fluid secondary valve 64 is controlled on the basis of the sensor signal of the sensor 76 and of a triggering signal of the triggering unit 14. If the first mating fluid connection 58 is in the predetermined arrangement and the triggering unit 14 has been actuated, the first control unit 24 can open the main valve 22 and the second control unit 66 can open the fluid secondary valve 64, with the result that a vacuum supplied by a fluid suction source is applied to the first mating fluid connection 58 and thus also supplied to the compaction device 74 of the trolley 68. The compaction of the waste bag 72 and of the waste collected therein can then take place.

The trolley 68 illustrated in FIG. 4 can furthermore have an elastically deformable compaction sleeve 78, which is assigned to the compaction device 74 and which forms the waste bag receiving space 70. If a vacuum is supplied to the compaction device 74, the air can be sucked out of the compaction sleeve 78, with the result that said sleeve collapses and, in the process, compresses or compacts the waste bag 72 and the waste collected therein. However, this embodiment of the compaction device 74 is just one of many possibilities for compacting the waste bag 72 and the waste collected therein.

Figure 5:
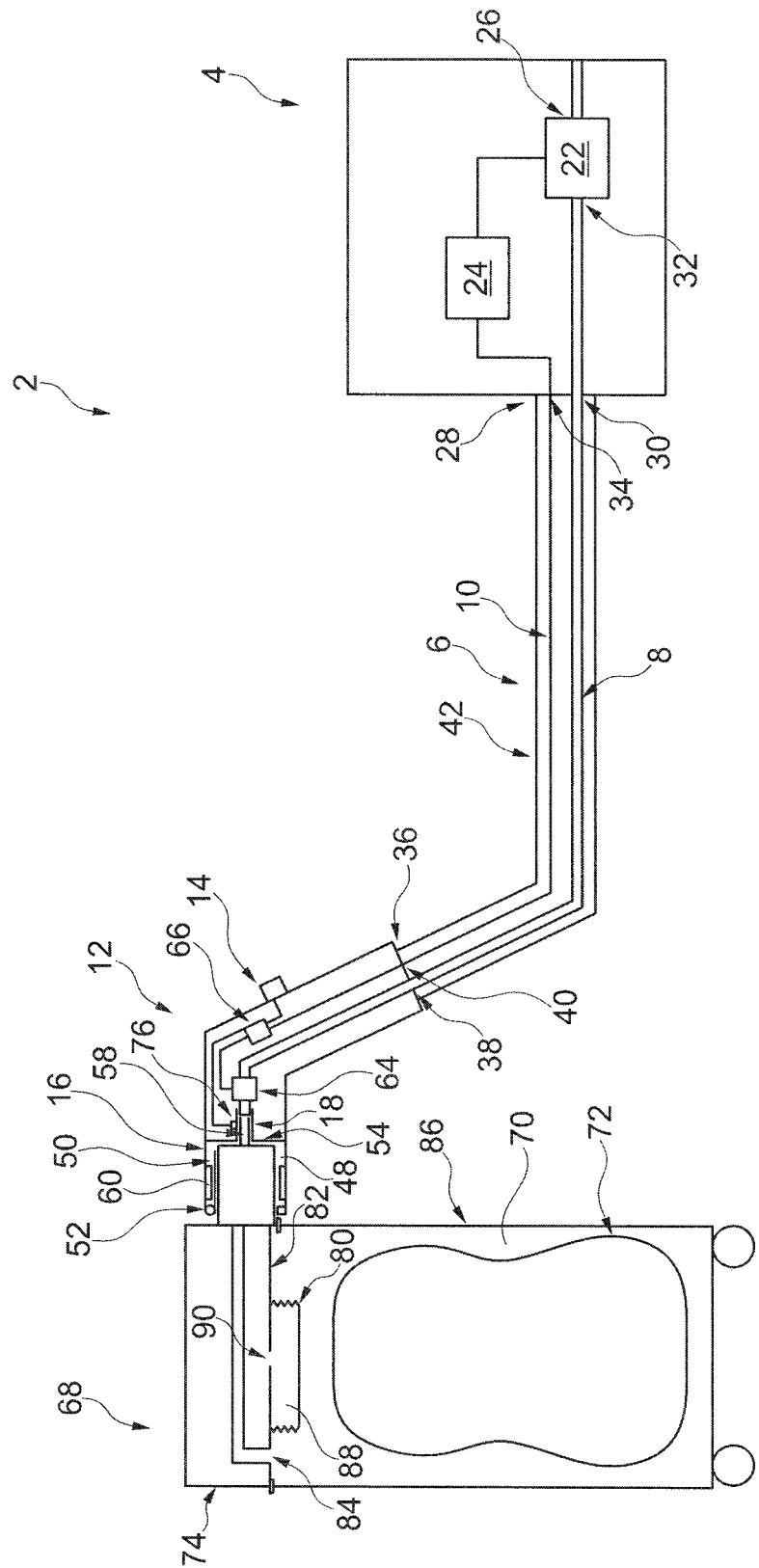
FIG. 5 shows another illustrative embodiment of the system in a schematic illustration.
Figure 6:
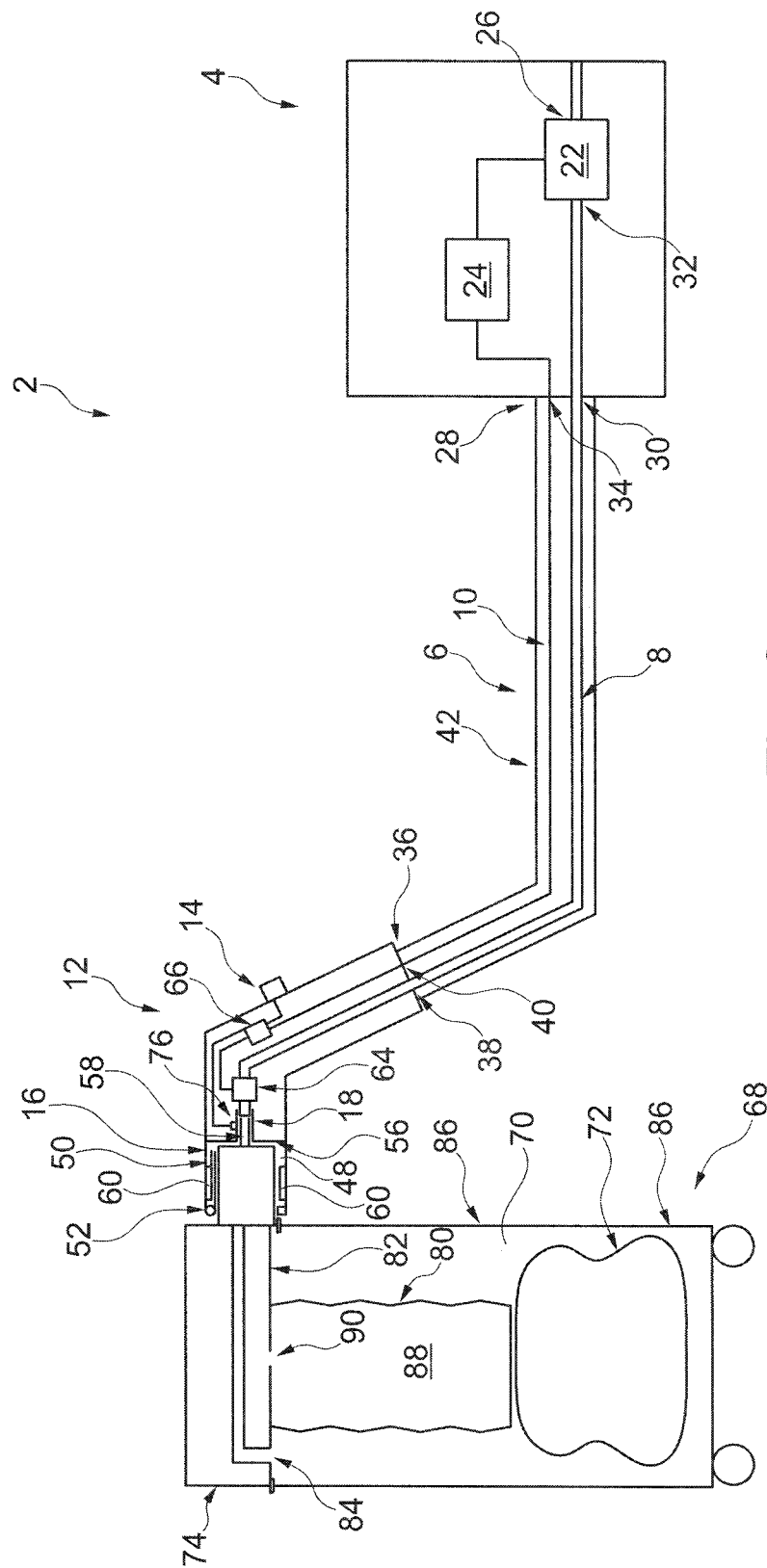
FIG. 6 shows another illustrative embodiment of the system in a schematic illustration.

Another embodiment of the system 2 is illustrated schematically in FIG. 5. Here, the system 2 differs essentially in the embodiment of the trolley 68. This is because the compaction device 74 of the trolley 68 has a pneumatically extendable and retractable bellows 80 for compacting the waste bag 72. Here, the bellows 80 is arranged on an underside of a lid 82 formed by the compaction device 74. The lid 82 has an extraction passage 84, which is formed by a hole through the lid 82. In this case, the hole is arranged radially on the outside relative to the bellows 80. Moreover, the lid 84 for compacting the waste bag is brought into connection with a trolley housing 86 of the trolley 68 in such a way that the lid 82 closes off the waste bag receiving space 70 airtightly, apart from the extraction passage 84. The extraction passage 84 is connected to the first mating fluid connection 58 by means of a fluid line. If a vacuum is then applied to the first mating fluid connection 58, this vacuum is also applied to the extraction passage 84, bringing about extraction of fluid, in particular air, by suction from the waste bag receiving space 70. An interior 88 of the bellows 80 is connected at least indirectly to the ambient air by a further passage 90 in the lid 82. By virtue of the extraction of fluid, in particular air, by suction from the waste bag receiving space 70, a force in the direction of the waste bag 72 acts on the bellows 80, with the result that the waste bag is compacted as the fluid, in particular air, is extracted from the waste bag receiving space 70. The correspondingly extended bellows 80 is illustrated in FIG. 6, the waste bag 72 thus being compacted by the extended bellows 80.

Another advantageous embodiment of the system 2 will be explained in combination with FIG. 2. FIG. 2 shows the adapter 12 in a schematic, semitransparent illustration. Here, provision is made for the connection housing 16 to have a further, second fluid connection 92. The second fluid connection 92 is designed for coupling to a second mating fluid connection (not illustrated). The second mating fluid connection can be assigned to the mating adapter 44. In this case, the second fluid connection 92 is arranged on the wall 54 of the receiving space 48 which is situated opposite the access opening 46. Moreover, provision is preferably made for the fluid secondary valve 64 to be designed in the manner of a 3/2-way valve. In this case, the first inlet (not illustrated) of the fluid secondary valve 64 is fluidically connected at least indirectly to the second end 38 of the first fluid line 8. The first outlet 94 of the fluid secondary valve 64 is fluidically connected at least indirectly to the first fluid connection 18. A second outlet 96 of the fluid secondary valve 64 is fluidically connected at least indirectly to the second fluid connection 92. Moreover, the fluid secondary valve 64 is designed to be controllable in such a way, in particular by the second control unit 66, that the first inlet of the fluid secondary valve 64 can be coupled either to the first outlet 94 or the second outlet 92. Thus, a vacuum applied to the first inlet of the fluid secondary valve 64 can be applied either to the first or second outlet 94, 96 or to the first fluid connection 18 or the second fluid connection 94. Provision is furthermore preferably made for the fluid secondary valve 64 to have a second inlet 98, which is fluidically connected at least indirectly to a vent connection 100 of the connection housing 16 or of the adapter 12. In this case, the fluid secondary valve 64, is designed to be controllable in such a way, in particular by means of the second control unit 66, that the second inlet 98 of the fluid secondary valve 64 is coupled to the first or the second outlet 94, 96 of the fluid secondary valve 64 in the reverse way to the first inlet of the fluid secondary valve 64. The fluid secondary valve 64 can thus preferably be designed in the manner of a 4/2-way valve.

If the mating adapter 44 has the second mating fluid connection, the second mating fluid connection can be formed in fluid communication with the further passage 90 of the compaction device 74, for example. After the waste bag 72 has been compacted, as illustrated by way of example in FIG. 6, the fluid secondary valve 64 can be controlled in such a way that the first inlet of the fluid secondary valve 64 is coupled to the second outlet of the fluid secondary valve, and the second inlet 98 of the fluid secondary valve 64 is coupled to the first outlet 94 of the fluid secondary valve 64. In this case, a corresponding vacuum can be applied to the further passage 90, with the result that the air is extracted by suction from the interior 88 of the bellows 80. In this case, ambient air can flow through the extraction passage 84 into the waste bag receiving space 70. Owing to the extraction of the air from the interior 88 of the bellows 80, the bellows is compressed, with the result that the bellows 80 re-assumes the position illustrated by way of example in FIG. 5. To summarize, it can be stated that the bellows 80 can be moved between an extended position and a retracted position by controlling the fluid secondary valve 64.

In addition, it should be pointed out that "having" does not exclude any other elements or steps and "a" or "an" does not exclude a multiplicity. It should furthermore be pointed out that features which have been described with reference to one of the above illustrative embodiments can also be used in combination with other features of other illustrative embodiments described above. References in the claims should not be regarded as restrictive. The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A system for extracting a fluid by suction from a cart having a mating adapter, the system comprising:
   a cabin monument for a vehicle, the cabin monument comprising a controllable fluid main valve having an inlet and an outlet, the inlet configured to at least indirectly couple to a fluid suction source, and the cabin monument further comprising a control unit to control operation of the fluid main valve;
   a hose comprising a fluid line and a control signal line, the hose having a first end and a second end, the first end of the hose connected to the cabin monument such that a first end of the fluid line is fluidically connected at least indirectly to the outlet of the fluid main valve and such that a first end of the control signal line is connected at least indirectly to the control unit for signal transmission; and
   a hose adapter to couple with the mating adapter of the cart, the hose adapter comprising a triggering unit and a connection housing with a fluid connection, the second end of the hose connected to the hose adapter such that a second end of the control signal line is connected at least indirectly to the triggering unit and such that a second end of the fluid line is fluidically connected at least indirectly to the fluid connection of the connection housing, wherein the fluid connection of the connection housing is configured to couple to a first mating fluid connection of the mating adapter when the hose adapter is coupled with the mating adapter;
   wherein actuation of the triggering unit transmits a triggering signal to the control unit of the cabin monument via the control signal line; and
   wherein the control unit is configured to control operation of the fluid main valve on the basis of the triggering signal as received from the triggering unit.

2. The system as claimed in claim 1, wherein a receiving space which is at least substantially closed apart from an access opening is formed by the connection housing, and the fluid connection is arranged on a wall of the receiving space which is opposite the access opening.

3. The system as claimed in claim 2, wherein the connection housing has a guide comprising at least one guide element, at least one guide pin, and/or at least one guide hole.

4. The system as claimed in claim 2, wherein the access opening is assigned an automatically closing flap, which is movable between an open position and a closed position.

5. The system as claimed in claim 1, wherein the hose adapter has a controllable fluid secondary valve coupled between the fluid connection of the connection housing and the second end of the fluid line, and the hose adapter has a second control unit for controlling the fluid secondary valve, wherein the second control unit is configured to control the fluid secondary valve at least indirectly on the basis of the triggering signal.

6. The system as claimed in claim 5, wherein the hose adapter has a sensor to detect a predetermined arrangement of a mating fluid connection in the receiving space and/or at the fluid connection of the connection housing, wherein the control unit controls the fluid main valve, and/or the second control unit controls the fluid secondary valve, in each case at least indirectly on the basis of a sensor signal of the sensor and of the triggering signal.

7. The system as claimed in claim 5, wherein the connection housing has a second fluid connection, the second fluid connection of the connection housing is configured to couple to a second mating fluid connection, the second fluid connection is arranged on the wall of the receiving space, a first inlet of the fluid secondary valve is fluidically connected at least indirectly to the second end of the fluid line, a first outlet of the fluid secondary valve is fluidically connected at least indirectly to the fluid connection, a second outlet of the fluid secondary valve is fluidically connected at least indirectly to the second fluid connection, and the fluid secondary valve can be controlled such that the first inlet of the fluid secondary valve is coupled either to the first or the second outlet of the fluid secondary valve.

8. The system as claimed in claim 7, wherein the fluid secondary valve has a second inlet, which is fluidically connected at least indirectly to a vent connection of the hose adapter, and the fluid secondary valve is designed to be controllable in such a way that the second inlet of the fluid secondary valve is coupled to the first or the second outlet of the fluid secondary valve in the reverse way to the first inlet of the fluid secondary valve.

9. The system as claimed in claim 1, wherein the cabin monument has a receiving device for the releasable reception of the hose adapter.

10. The system as claimed in claim 1, wherein the cabin monument has a rinsing device for rinsing the connection housing.

11. The system as claimed in claim 1, wherein the cabin monument has a hose retraction device for the hose configured to automatically retract the hose.

12. The system as claimed in claim 1, wherein the cart is a trolley having a pneumatic compaction device, wherein the trolley has a waste bag receiving space, in which a waste bag for collecting waste is arranged, and wherein the trolley has the first mating fluid connection, which is fluidically connected at least indirectly to the compaction device.

13. The system as claimed in claim 12, wherein the compaction device has a pneumatically extendable and retractable bellows for compacting the waste bag, wherein the compaction device extends the bellows to compact the waste bag when a vacuum is applied to the first mating fluid connection.

14. The system as claimed in claim 13, wherein the trolley has a second mating fluid connection, which is fluidically connected at least indirectly to a bellows interior of the bellows.

15. A vehicle comprising the system for extracting a fluid by suction as claimed in claim 1.

16. The vehicle as claimed in claim 15, wherein the vehicle is an aircraft.

* * * * *